United States Patent [19]
Igl et al.

[11] Patent Number: 5,973,292
[45] Date of Patent: Oct. 26, 1999

[54] FLARED NOZZLE FOR WELDING GUN AND DEVICE FOR MAKING SAME

[75] Inventors: Adrian J. Igl; Brian W. Pease, both of Antigo, Wis.

[73] Assignee: Innovative Industries of Antigo, Inc., Antigo, Wis.

[21] Appl. No.: 08/575,813

[22] Filed: Dec. 20, 1995

[51] Int. Cl.⁶ .................................................. B23K 9/173
[52] U.S. Cl. .......................... 219/137.42; 72/62; 219/136
[58] Field of Search ................................ 219/137.42, 72, 219/74, 75, 136, 137.2, 137.31, 137.41; 72/62, 317, 392, 393

[56] References Cited

U.S. PATENT DOCUMENTS

| | | | |
|---|---|---|---|
| 183,241 | 10/1876 | Work | 72/393 |
| 2,672,175 | 3/1954 | Howard | 72/393 |
| 2,833,913 | 5/1958 | Bernard . | |
| 2,836,705 | 5/1958 | Cotter . | |
| 3,284,608 | 11/1966 | McDonald . | |
| 3,798,409 | 3/1974 | Troyer et al. . | |
| 4,052,632 | 10/1977 | Sagara et al. | 219/74 |
| 4,087,670 | 5/1978 | Miller | 219/72 |
| 4,656,329 | 4/1987 | Moerke | 219/136 |
| 4,682,006 | 7/1987 | Gordon | 219/74 |
| 4,727,238 | 2/1988 | Mann . | |
| 5,015,822 | 5/1991 | Mann . | |
| 5,433,100 | 7/1995 | Easterbrook et al. | 72/393 |
| 5,562,000 | 10/1996 | Shultz, Sr. | 72/393 |

*Primary Examiner*—Clifford C. Shaw
*Attorney, Agent, or Firm*—Andrus, Sceales, Starke & Sawall

[57] ABSTRACT

A nozzle for welding gun having a torch body and a device for making the same are provided. The nozzle includes a generally cylindrical tube having an inner peripheral surface defining a passageway adapted for receiving a welding wire therethrough. The generally cylindrical tube includes a first end for receipt within a torch body of the welding gun, a second, opposite flared end and a body portion therebetween.

12 Claims, 1 Drawing Sheet

FLARED NOZZLE FOR WELDING GUN AND DEVICE FOR MAKING SAME

BACKGROUND AND SUMMARY OF THE PRESENT INVENTION

This invention relates to welding, and more particularly, to a nozzle for a welding gun.

During arc welding, bits of the surfaces to be welded splatter and become attached to the inside wall of the nozzle. This metal, generally referred to as weld spatter or slag, builds up inside the inner wall of the nozzle and accumulates, thereby reducing the diameter of the opening at the end of the nozzle. As is known, the size of the opening 30 in nozzle 10 must be of a sufficient inner diameter to adequately shield the electrode and maintain the quality of any weld.

To remove the accumulated slag from within the interior of the nozzle, a tool such as a screw driver or the like is used to scrape it out. This is a time consuming operation and one which is difficult to accomplish. The layers of slag along the inside wall of the nozzle may be sufficiently hard and sufficiently bonded to the inside of the nozzle that removal becomes next to impossible.

In the alternative, a reamer may be used to ream out the hole of the nozzle from the outside. While the use of such a reamer is more efficient in its cleaning action than the use of a tool, the time necessary to stop welding and remove the accumulated slag increases the cost of the entire welding operation.

A still further method for using the accumulated slag is to rap the outside of the nozzle against a hard surface in order to dislodge the slag attached to the inside wall of the nozzle. While this has proved somewhat effective, continuous rapping of the nozzle against a hard surface with sufficient force to dislodge the slag may cause damage to the nozzle. Hence, if the damage to the nozzle is too severe, it becomes necessary to stop the welding process and replace the nozzle. As previously described, each stoppage in the welding process increases the cost of the entire welding operation, and repeated replacement of the nozzle may be cost prohibitive.

Therefore, it is a primary object and feature of the present invention to provide a nozzle for a welding gun which facilitates the removal of accumulated slag which becomes attached to the inside wall of the nozzle during a welding operation.

It is a further object and feature of the present invention to provide a nozzle for a welding gun which is simple to utilize and inexpensive to manufacture.

It is a further object and feature of the present invention to provide a device for manufacturing a nozzle which facilitates the removal of accumulated slag which attaches to the inside wall of the nozzle during a welding operation.

It is a further object and feature of the present invention to provide a method of creating a nozzle which facilitates the removal of accumulated slag which attaches to the inside wall of the nozzle during a welding operation.

In accordance with the present invention, a nozzle is provided for a welding gun having a torch body. The nozzle includes a generally cylindrical tube defining a passageway adapted for receiving a welding wire therethrough. The generally cylindrical tube has a first end for receipt within the torch body of the welding gun, and a second, opposite flared end. A body portion of the generally cylindrical tube interconnects the first and second ends.

In further accordance with the present invention, a device is provided for flaring the end of the generally cylindrical tube which has a predetermined diameter. An arbor is provided which has a support surface therein for supporting a first end of the generally cylindrical tube. The first end of a tapered portion of a tool is received within the second end of the generally cylindrical tube. The first end of the tapered portion has a diameter less than the diameter of the generally cylindrical tube. The second end of the tapered portion of the tool has a diameter greater than the diameter of the generally cylindrical tube. The tapered portion of the tool tapers from its second end to its first end at a predetermined angle.

Means are provided for urging the tapered portion of the tool toward the arbor such that the tapered portion of the tool is urged into the second end of the generally cylindrical tube. By urging the tapered portion of the tool into the generally cylindrical tube, the tapered portion flares the second end of the generally cylindrical tube to an angle generally equal to the predetermined angle of the taper.

In accordance with the present invention, a method is provided for flaring the second end of the generally cylindrical tube. The method includes supporting a first end of the generally cylindrical tube so as to prevent a lateral movement thereof, and providing a tool which includes a tapered portion having a first end of a diameter greater than the inner diameter of the generally cylindrical tube, and a second end of a diameter less than the inner diameter of a generally cylindrical tube.

The method further includes inserting the second end of the tapered portion of the tool into the second end of the generally cylindrical tube, and urging the tapered portion of the tool further into the second end of the generally cylindrical tube so as to flare the second end of the generally cylindrical tube.

BRIEF DESCRIPTION OF THE PREFERRED EMBODIMENT

The drawings furnished herewith illustrate a preferred construction of the present invention in which the above advantages and features are clearly disclosed as well as others which will be readily understood from the following description of the illustrated embodiment.

DETAILED DESCRIPTION OF THE PREFERRED EMBODIMENT

Figure 1:
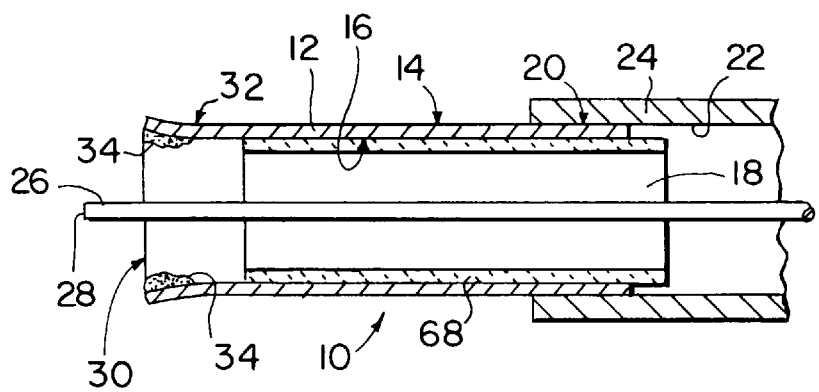
FIG. 1 is a cross-sectional view of the nozzle of the present invention supported within a torch body of a welding gun.

A nozzle in accordance with the present invention is generally designated by the reference numeral 10. Nozzle 10 is formed from a generally cylindrical tube 12 which defines an outer cylindrical surface 14 of nozzle 10 and an inner peripheral surface 16 of nozzle 10. Inner peripheral surface 16 of nozzle 10 defines a passageway 18 which allows for the passage of a gas stream through nozzle 10.

Nozzle 10 includes a first end 20 which is adapted for receipt within an annular passageway 22 formed in the torch body 24 of a welding gun (not pictured). An electrode extends from within the welding gun through the torch body 24 and the passageway 18 and nozzle 10, as best seen in FIG. 1.

In operation, electrode 26 is energized with a welding current so as to provide an arc between the tip 28 of the electrode 26 and the surfaces to be welded. The gas stream flowing through passageway 18 of nozzle 10 shields electrode 26 to prevent the electrode metal from becoming oxidized as it transfers through the arc.

Nozzle 10 further includes a second flared end 32 which defines opening 30 in nozzle 10. As is known, during welding, weld metal in the form of minute globules is consistingly being abutted out of a crater formed by the jet action of the arc. In that the opening 30 of the nozzle 10 is always directly over the crater, a large portion of the splashed-out metal, generally referred to as weld spatter or slag 34, becomes attached to the inside wall of nozzle 10. As best seen in FIG. 1, the nozzle 10 of the present invention, the slag 34 bonds to inner peripheral surface 16 at flared end 32. It is the flared end 32 of nozzle 10 which allows for the simple removal of the accumulated slag 34 from the interior peripheral surface 16 of nozzle 10.

In order to remove slag 34 from inner peripheral surface 16 of nozzle 10, nozzle 10 is simply tapped against a hard surface thereby dislodging any slag 34 attached to the inner peripheral surface 16 of nozzle 10. Due to the flared 32 of nozzle 10, the tapping required to dislodge end slag 34 is significantly less than rapping required to dislodge the slag attached at the inside wall of previous, prior art nozzles. As such, the tapping of the nozzle 10 against a hard surface to dislodge slag 34 does not cause any damage to outer cylindrical surface 14 of nozzle 10. Hence, there is less stoppage of the welding process to replace nozzle 10, which, in turn, reduces the cost of the entire welding operation.

Figure 2:
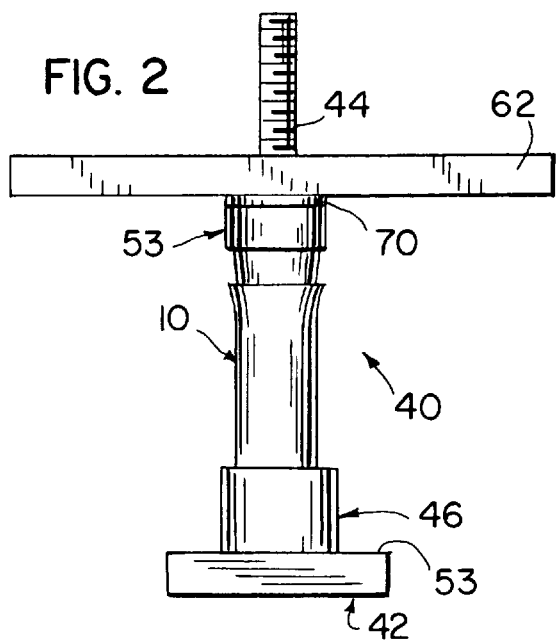
FIG. 2 is a front-elevational view showing the flaring device of the present invention in operation flaring one end of the nozzle of the present invention.

The present invention further includes a device to flare the end 32 of nozzle 10. The flaring device is generally designed by the reference number 40. Referring to FIG. 2, the flaring device 40 includes a base 42 having a threaded shaft 44 extending therefrom.

Figure 4:
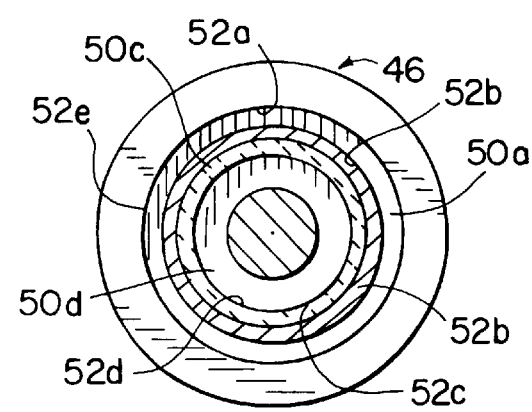
FIG. 4 is a cross-sectional view of the flaring device and the nozzle of FIG. 3 taken along line 4—4.

A generally cylindrical arbor 46 is provided and includes a passageway 48 for accommodating shaft 44 therethrough. Passageway 48 includes a plurality of concentric, circular, support surfaces 58*a–d*, FIG. 4, which have a diameter generally equal to the outer diameter of most common sized nozzles. Passageway 48 is also defined by a plurality of concentric, vertical bearing surfaces 52*a–e*.

Flaring device 40 further includes a tool 53 having a base 54, a tapered portion 56 depending therefrom, and a passageway 55 extending therethrough. Tapered portion 54 has a first end 58 having a diameter greater than inner diameter of nozzle 10, and a second end 60 having a diameter less than the inner diameter of nozzle 10. The tapered portion 54 tapers from the first end 58 to the second end 60 at a predetermined angle corresponding to the desired angle of flare in end 32 of nozzle 10.

Flaring device 40 further includes a flaring bar 62 having a threaded opening 64 therethrough. Threaded opening 64 is adapted for receipt on threaded shaft 44 for reasons hereinafter described.

Figure 3:
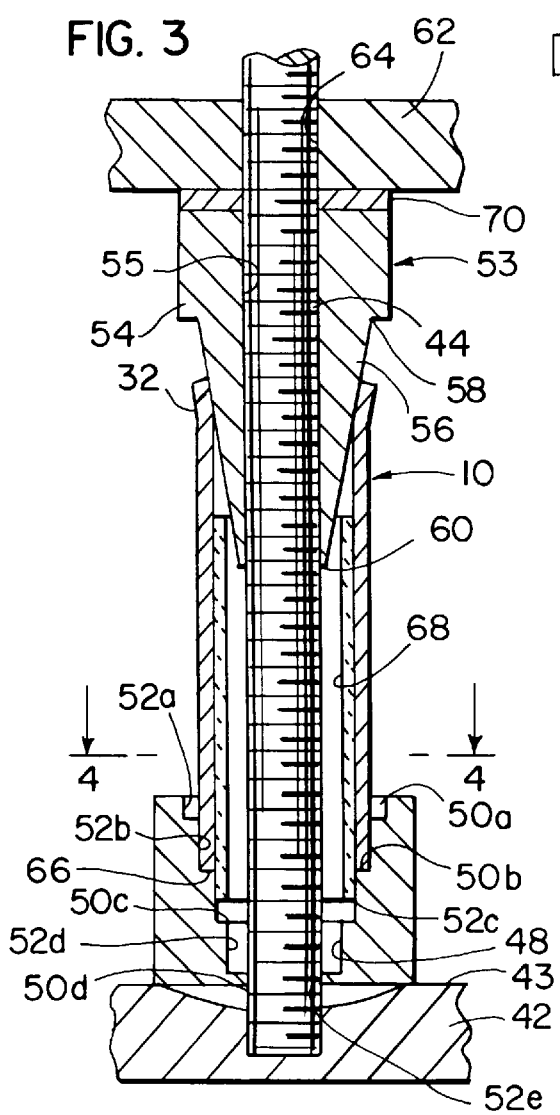
FIG. 3 is a cross-sectional view showing a portion of the flaring device and the nozzle of FIG. 2.

In operation, arbor 46 is positioned about threaded shaft 44 such that vertical bearing surface 50*e* bears against bar 44 and prevents lateral movement of arbor 46 with respect to arbor support surface 43 of base 42. A cylindrical nozzle 10 having first and second ends, as previously described, is positioned over threaded shaft 44 such that surface 66 on the first end 20 the nozzle 10 engages the corresponding circular support surface 50*a–d*, and such that the outer cylindrical surface 14 of the nozzle 10 bears against a corresponding vertical bearing surface 52*a*–52*e* to prevent lateral movement of nozzle 10 along its corresponding support surface 50*a–d* in arbor 46. As best seen in FIG. 3, by way of example, surface 66 on first end 26 of nozzle 10 is supported by surface 50*b* in arbor 46 in the outer cylindrical surface 14 of nozzle 20 bears against vertical bearing surface 52*b*.

As is known, nozzle 10 may include an inner sleeve 68 mounted to the inner peripheral surface 16 of nozzle 10 such that the sleeve 68 extends from the end 20 of nozzle 10 beyond surface 66. In order to accommodate nozzles utilizing an inner sleeve 68, each concentric, circular support surface 50*a–d* has a width generally equal to the width of generally cylindrical tube 12, FIGS. 3–4.

In order to flare end 32 of nozzle 10, tool 53 is positioned such that the second end 60 of tapered portion 56 is received within passageway 18 of nozzle 10. Flaring bar 62 is threaded onto threaded bar 44 so as to engage the bar 54 of tool 53. As flaring bar 62 is threaded onto threaded shaft 54, tool 53 is urged toward the base 42 of flaring device 40. A washer 70 may be positioned between flaring bar 62 and tool 53 to facilitate rotation and thereby the threading of bar 62 onto shaft 44.

As tool 53 is urged toward base 42 of flaring device 40, the tapered portion 56 of tool 53 is urged into end 32 of nozzle 10 thereby flaring the end 32 to an angle generally equal to the predetermined angle of the tapered portion.

After the tapering end 32 of nozzle 10 is completed, bar 62 is unthreaded from threaded shaft 44, and tool 53 is removed. Nozzle 10 is then removed from the flaring device 40 and positioned in the torch body 24 of a welding gun, as heretofore described.

Various modes of carrying out the invention are contemplated as being within the scope of the following claims particularly pointing out and distinctly claiming the subject matter which is regarded as the invention.

I claim:

1. A device for flaring an end of a generally cylindrical tube having first and second ends and a predetermined inner diameter, comprising:

an arbor having a support surface for supporting the first end of the generally cylindrical tube and including a passageway extending therethrough, the passageway partially defined by the support surface of the arbor;

a tool including a tapered portion having a first end having a diameter greater than the inner diameter of the generally cylindrical tube, and a second end having a diameter less than the inner diameter of the generally cylindrical tube and adapted for receipt within the second end of the generally cylindrical tube, the tapered portion tapering from the first end to the second end at a predetermined angle; and tapering structure for urging the tapered portion of the tool toward the arbor and further into the second end of the generally cylindrical tube such that the tapered portion flares the second end of the generally cylindrical tube to an angle generally equal to the predetermined angle of the taper.

2. The device of claim 1 wherein the means for urging the tapered portion of the tool toward the arbor includes a base structure having an arbor engaging surface, and a threaded shaft extending therefrom, the threaded shaft extending through the passageway in the arbor.

3. The device of claim 2 wherein the passageway in the arbor is partially defined by a generally cylindrical bearing surface which prevents lateral movement of the arbor along the arbor support surface of the base structure.

4. The device of claim 2 wherein the tool includes a passageway for receiving the threaded shaft therethrough.

5. The device of claim 4 wherein the means for urging the tapered portion of the tool toward the arbor further includes a flaring bar for threading onto the threaded shaft such that the flaring bar engages the tool and urges the tool along the threaded shaft in response to the threading of the flaring bar onto the threaded shaft.

6. The device of claim 1 wherein the passageway in the arbor is further defined by a generally cylindrical tube bearing surface generally perpendicular to the support surface, the tube bearing surface preventing lateral movement of the generally cylindrical tube along the support surface.

7. A welding gun having a torch body, comprising
- a nozzle including a generally cylindrical tube and extending along a longitudinal axis and having an inner peripheral surface, the generally cylindrical tube including a first end for receipt within the torch body of the welding gun, a second, opposite flared end, and body portion therethrough;
- a sleeve secured to the inner peripheral surface of the general cylindrical tube, the sleeve including an inner surface partially defining a passageway through the generally cylindrical tube; and
- a welding wire having an outer surface and extending through the passageway, the outer surface of the welding wire and the inner surface of the sleeve defining a void in the passageway.

8. The nozzle of claim 7 wherein the passageway terminates at an opening at the flared end of the generally cylindrical tube.

9. The nozzle of claim 7 wherein the first end of the generally cylindrical tube has a predetermined diameter.

10. The nozzle of claim 9 wherein the body portion has a predetermined diameter generally equal to the predetermined diameter of the first end of the generally cylindrical tube.

11. The nozzle of claim 10 wherein the flared end has a diameter greater than the predetermined diameter of the body portion of the generally cylindrical tube.

12. A method for flaring an end of a generally cylindrical tube having first and second ends and a predetermined diameter, comprising the steps of:

providing an arbor having a cavity therein, the cavity partially defined by a tube supporting surface of the arbor;

positioning the first end of the generally cylindrical tube within the arbor so as to engage the tube supporting surface of the arbor;

providing a tool which includes a tapered portion having a first end of a diameter greater than the inner diameter of the generally cylindrical tube, and a second end of a diameter less than the inner diameter of the generally cylindrical tube;

inserting the second end of the tapered portion of the tool into the second end of the generally cylindrical tube; and urging the tapered portion further into a second end of the generally cylindrical tube so as to flare the second end of the generally cylindrical tube.

* * * * *